United States Patent
Fugel et al.

(10) Patent No.: US 10,913,446 B2
(45) Date of Patent: Feb. 9, 2021

(54) METHOD FOR OPERATING A SERIAL-PARALLEL HYBRID POWERTRAIN OF A MOTOR VEHICLE, AND MOTOR VEHICLE

(71) Applicant: Volkswagen Aktiengesellschaft, Wolfsburg (DE)

(72) Inventors: Markus Fugel, Braunschweig (DE); Peter Neukirchner, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/287,619

(22) Filed: Feb. 27, 2019

(65) Prior Publication Data
US 2019/0263386 A1    Aug. 29, 2019

(30) Foreign Application Priority Data

Feb. 27, 2018 (DE) .......... 10 2018 104 451

(51) Int. Cl.
*B60K 1/02*      (2006.01)
*B60K 6/44*      (2007.10)
(Continued)

(52) U.S. Cl.
CPC .............. *B60W 20/19* (2016.01); *B60K 6/44* (2013.01); *B60W 20/40* (2013.01);
(Continued)

(58) Field of Classification Search
CPC ........... B60K 1/02; B60K 6/44; B60W 10/06; B60W 10/08; B60W 20/10; B60W 20/40
See application file for complete search history.

(56) References Cited

U.S. PATENT DOCUMENTS 6,209,672 B1 * 4/2001 Severinsky ............ B60K 6/442
                                            180/65.23
6,715,572 B2 * 4/2004 Shimabukuro ....... B60W 20/40
                                            180/65.6

(Continued)

FOREIGN PATENT DOCUMENTS

DE         102 24 189 A1    12/2002
DE    10 2015 222 690 A1     5/2017
JP        2009-210 045 A     9/2017

OTHER PUBLICATIONS

Search report for German Patent Application No. 10 2018 104 451.8, dated Nov. 5, 2018.

*Primary Examiner* — Tisha D Lewis
(74) *Attorney, Agent, or Firm* — Pearl Cohen Zedek Latzer Baratz LLP

(57) ABSTRACT

A method for operating a serial-parallel hybrid powertrain of a motor vehicle has the steps of mechanically decoupling the internal combustion engine from the wheels of the motor vehicle, accelerating the motor vehicle from a first speed to a second speed by means of the second electric machine, and increasing the speed n of the internal combustion engine from a first rotational speed to a second rotational speed. Increasing the speed of the internal combustion engine from the first rotational speed to the second rotational speed always takes place as a function of the increase in the speed of the motor vehicle from the first speed to the second speed. A motor vehicle may have such a serial-parallel hybrid powertrain.

9 Claims, 6 Drawing Sheets

Driving speed

(51) Int. Cl.
 *B60W 10/06* (2006.01)
 *B60W 10/08* (2006.01)
 *B60W 20/10* (2016.01)
 *B60W 20/40* (2016.01)
 *B60W 20/19* (2016.01)

(52) U.S. Cl.
 CPC ............... *B60W 2510/0638* (2013.01); *B60W 2510/081* (2013.01); *B60W 2710/0644* (2013.01); *B60W 2710/081* (2013.01)

(56) References Cited

U.S. PATENT DOCUMENTS

| | | | |
|---|---|---|---|
| 2002/0179351 A1 | 12/2002 | Shimabukuro et al. | |
| 2010/0210411 A1* | 8/2010 | Tang | B60W 10/02 477/5 |
| 2011/0301792 A1* | 12/2011 | Yamazaki | B60K 6/52 701/22 |
| 2016/0251010 A1* | 9/2016 | Hata | B60W 10/08 701/22 |

* cited by examiner

METHOD FOR OPERATING A SERIAL-PARALLEL HYBRID POWERTRAIN OF A MOTOR VEHICLE, AND MOTOR VEHICLE

CROSS-REFERENCE TO RELATED APPLICATIONS

This application claims priority from German Patent Application No. 10 2018 104 451.8, filed Feb. 27, 2018, which is hereby incorporated by reference.

FIELD OF THE INVENTION

The present invention relates to a method for operating a serial-parallel hybrid powertrain of a motor vehicle having an internal combustion engine, a first electric machine that is mechanically coupleable to the internal combustion engine, and a second electric machine that is mechanically coupleable to at least one wheel. The invention further relates to a motor vehicle having a serial-parallel hybrid powertrain.

BACKGROUND OF THE INVENTION

Known serial-parallel hybrid powertrains have an internal combustion engine that is mechanically coupled to a first electric machine. This mechanical coupling is generally implemented as a permanent mechanical coupling, in particular by means of a nonshiftable single-speed transmission. Thus, a specific rotational speed ratio is present between the first electric machine and the internal combustion engine. In addition, known serial-parallel hybrid powertrains have a second electric machine that is mechanically coupled to at least one wheel, preferably at least two wheels, of the motor vehicle. This mechanical coupling is generally likewise implemented as a permanent mechanical coupling, in particular by means of a nonshiftable multispeed transmission. Furthermore, the internal combustion engine is mechanically coupleable to the second electric machine or to the at least one wheel by means of a separating clutch. Lastly, known serial-parallel hybrid powertrains have a battery that is designed for receiving electrical energy from the first electric machine and the second electric machine, and for delivering electrical energy to the first electric machine and the second electric machine.

The internal combustion engine and the transmission of the powertrain are designed in such a way that coupling the internal combustion engine to the wheels by engaging the separating clutch cannot take place until above a predetermined minimum speed of the motor vehicle, namely, when a resulting speed in the internal combustion engine is greater than or equal to the idle speed of the internal combustion engine. In addition, a maximum power output of the internal combustion engine is possible only at speeds that are significantly higher than the idle speed.

For this reason, in acceleration operations from relatively low speeds, serial-parallel hybrid powertrains are operated in a serial mode. In serial mode the separating clutch is disengaged, so that the internal combustion engine is mechanically decoupled from the wheels and from the second electric machine. The internal combustion engine drives the first electric machine, so that the latter generates electrical current and feeds it into the battery or provides it directly to the second electric machine. The drive torque is then provided solely by the second electric machine.

In known serial-parallel hybrid powertrains, a naturally aspirated engine is used as the internal combustion engine, and is characteristically designed to deliver its maximum internal combustion engine power in only one rotational speed point/range that is close to a maximum speed of the internal combustion engine. In order to accelerate the motor vehicle from a low speed, and for this purpose to generate sufficient electrical energy by means of the first electric machine, the speed of the internal combustion engine is adjusted according to the power demand by the driver. At maximum power demand, the internal combustion engine thus operates close to the maximum speed. In this state, driving noise from the motor vehicle is dominated by the internal combustion engine that is operating at high speed. For a driver of the motor vehicle who is accustomed to conventional drives, in which the engine noise during acceleration varies corresponding to the particular gear, such an acoustic state is unfamiliar and is often perceived negatively. This effect is often also described as the "rubber band effect." This results in reduced customer acceptance of motor vehicles having a generic serial-parallel hybrid powertrain.

SUMMARY OF THE INVENTION

The object of the present invention, therefore, is to eliminate or at least partially eliminate the above-described disadvantages, with a method for operating a serial-parallel hybrid powertrain of a motor vehicle, and with a motor vehicle having a serial-parallel hybrid powertrain. In particular, the object of the present invention is to provide a method and a motor vehicle which, in a simple and cost-effective manner, result in an improved driving experience and thus, higher customer acceptance.

The above object is achieved by the patent claims. Accordingly, the object is achieved by a method for operating a serial-parallel hybrid powertrain of a motor vehicle having the features of independent claim 1, and by a motor vehicle having a serial-parallel hybrid powertrain having the features of further independent claim 9. Further features and details of the invention result from the subclaims, the description, and the drawings. Of course, features and details that are described in conjunction with the method according to the invention also apply in conjunction with the motor vehicle according to the invention, and vice versa, so that with regard to the disclosure, mutual reference is or may always be made to the individual aspects of the invention.

According to a first aspect of the invention, the object is achieved by a method for operating a serial-parallel hybrid powertrain of a motor vehicle. The serial-parallel hybrid powertrain has an internal combustion engine, a first electric machine that is mechanically coupled to the internal combustion engine, and a second electric machine that is mechanically coupled to at least one wheel of the motor vehicle. The method has the following steps:
- mechanically decoupling the internal combustion engine from the wheels of the motor vehicle,
- accelerating the motor vehicle from a first speed to a second speed by means of the second electric machine, and
- increasing the speed of the internal combustion engine from a first rotational speed to a second rotational speed.

According to the invention, increasing the speed of the internal combustion engine from the first rotational speed to the second rotational speed always takes place as a function of the increase in the speed of the motor vehicle from the first speed to the second speed.

The method according to the invention is designed for use in serial-parallel hybrid powertrains. In the serial-parallel hybrid powertrain, the internal combustion engine is mechanically coupled to the first electric machine, so that the speed of the internal combustion engine is in a predefined ratio with the speed of the first electric machine. The mechanical coupling is implemented, for example, by a single-speed nonshiftable transmission, so that the speed of the internal combustion engine is proportional to the speed of the first electric machine. The first electric machine is drivable by means of the internal combustion engine, so that the former is usable as a generator for generating electrical current.

In serial mode, the drive of the motor vehicle takes place by means of the second electric machine, which obtains the electrical current necessary for this purpose from the battery and/or from the first electric machine. The second electric machine is mechanically coupled to at least one wheel, preferably two wheels, particularly preferably four wheels, of the motor vehicle. This mechanical coupling may take place, for example, by means of a multispeed nonshiftable transmission. A shiftable transmission may also be provided.

In serial mode, the internal combustion engine and the first electric machine are mechanically decoupled from the wheel or the second electric machine, respectively, in particular by means of a separating clutch. Thus, according to the method according to the invention, initially the mechanical decoupling of the internal combustion engine from the wheels of the motor vehicle takes place. In this decoupled state, a speed of the internal combustion engine is settable independently of a speed of the wheels. A fairly long time period, for example for parking of the motor vehicle, may also be provided between the mechanical decoupling of the internal combustion engine and the acceleration of the motor vehicle. The mechanical decoupling of the internal combustion engine may also take place directly before the acceleration.

The acceleration of the motor vehicle from the first speed to the higher second speed and the increase in rotational speed of the internal combustion engine from the first rotational speed to the higher second rotational speed take place simultaneously or at least essentially simultaneously. It is preferred that at the first speed the internal combustion engine turns at the first rotational speed, and at the second speed turns at the second rotational speed. In addition, it is preferred that at the first rotational speed, the internal combustion engine is operated with the same internal combustion engine power as at the second rotational speed, or with at least 75% of the internal combustion engine power at the second rotational speed. It is particularly preferred that at the second rotational speed, the internal combustion engine is operated with at least 95% of a maximum power of the internal combustion engine. For carrying out the method, an internal combustion engine is particularly preferably used which at the first rotational speed and the second rotational speed has between 95% and 100% of the maximum power of the internal combustion engine.

If the available power between the first and the second rotational speed differ from one another due to the characteristic of the internal combustion engine, with appropriate available electrical power of the hybrid energy store this power deficit may be compensated for by the hybrid energy store by supplying the second electric machine with additional electrical power (boost).

Within the scope of the invention, a steady increase in the rotational speed is understood to mean that the rotational speed is continuously increased with increasing speed, at least over a significant range of the acceleration. This may mean, for example, that the second rotational speed may already be reached at 90% of the second speed and then preferably held constant. Alternatively, it may be provided that the second rotational speed is reached upon reaching the second speed. Alternatively, it may be provided that the first rotational speed is abruptly increased to a rotational speed between the first and the second rotational speed, and subsequently increased to the second rotational speed in the course of the increasing speed (behavior as a converter stage automatic transmission).

Within the scope of the invention, it is preferred that a power deficit of the internal combustion engine is compensated for by additional power consumption of the hybrid store when the target speed of the next higher virtual gear is reached. This operation is also referred to as boosting via the hybrid energy store.

The method according to the invention for operating a serial-parallel hybrid powertrain of a motor vehicle has the advantage over conventional methods that a relationship between the decoupled internal combustion engine and an acceleration is established in a cost-effective manner, using simple means. Vibrations and noise of the internal combustion engine, which are a function of the rotational speed, thus do not give occupants of the motor vehicle the impression of a direct relationship between the rotational speed of the internal combustion engine and the acceleration. Customer acceptance for motor vehicles having a serial-parallel hybrid powertrain may thus be significantly increased.

According to one preferred refinement of the invention, in a method it may be provided that the increase in rotational speed takes place in proportion to the increase in the speed. Within the scope of the invention, this is also understood to mean that an increase in the rotational speed within a significant portion, for example at least 80%, of the rotational speed increase is proportional to the increase in the speed in a significant portion, for example 80%, of the speed increase. In this way, changes in vibrations, in particular amplitudes of vibrations, and changes in noise, in particular sound levels of the noise, of the internal combustion engine may be directly correlated with the acceleration. A causal relationship between the rotational speed of the internal combustion engine and the speed of the motor vehicle is thus simulated for occupants of the motor vehicle. The method thus conveys to the occupants a driving experience that is felt with conventional drives, and therefore positively perceived as particularly realistic.

According to the invention, it is preferred that the motor vehicle is accelerated from the second speed to a third speed, the rotational speed of the internal combustion engine at the second speed initially being reduced and subsequently increased once again, the reduction in the rotational speed taking place more rapidly than the increase in the rotational speed. The reduction in the rotational speed takes place to avoid overspeeding of the internal combustion engine and the associated noise and vibrations as well as possible damage to the internal combustion engine. This is advantageous in particular when the second rotational speed corresponds or at least essentially corresponds to a maximum speed of the internal combustion engine. As the result of reducing the rotational speed, an effect is simulated that is comparable to a gear change to a higher gear. After or even during the reduction in the rotational speed of the internal combustion engine, the speed is increased from the second speed to the third speed. The rotational speed of the internal combustion engine is preferably increased at least over a significant portion of the increase in the speed from the second speed to the third speed. Due to the reduction in the rotational speed being more rapid than the subsequent increase in the rotational speed, this results in an improved effect of the upshifting according to a virtual gear. This operation is preferably repeated multiple times in order to simulate the successive upshifting over multiple gears. Due to such rotational speed control during acceleration from the first speed to the third speed, upshifting of a gear is simulated in a realistic manner using simple means, so that a particularly realistic driving experience according to a conventional drive concept with an internal combustion engine and a multigear transmission is achievable. Customer acceptance for a motor vehicle having a serial-parallel hybrid powertrain may be significantly improved in this way.

More preferably, in the reduction of the rotational speed, the speed of the internal combustion engine is reduced from the second rotational speed to the first rotational speed, or at least approximately to the first rotational speed or a higher rotational speed than the first rotational speed. After the reduction in the rotational speed, the internal combustion engine is thus once again operated at the rotational speed at the beginning of the method according to the invention or at a higher rotational speed. By means of such a rotational speed characteristic, a rotational speed characteristic of a geometrically matched transmission, as used in particular in commercial vehicle applications, may be simulated in a particularly realistic manner.

More preferably, the first rotational speed may be increased at higher driving speeds in order to represent a progressive gear ratio that is typical of a passenger vehicle (rotational speed jumps are smaller at higher speeds/virtual gears). In this way, the driving experience in a motor vehicle having a having a serial-parallel hybrid powertrain is adaptable to a driving experience in a conventional passenger vehicle, so that customer acceptance for a motor vehicle having a serial-parallel hybrid powertrain may be significantly improved.

In one particularly preferred embodiment of the method, the subsequent increase in the speed of the internal combustion engine takes place in such a way that at the third speed, the internal combustion engine has the second rotational speed or at least essentially the second rotational speed. After the rotational speed is once again increased, the internal combustion engine is again operated at the rotational speed according to the preceding method steps of the method according to the invention. Such a rotational speed characteristic corresponds to a rotational speed characteristic of a conventional motor vehicle having an internal combustion engine and a multigear transmission. The driving experience in a motor vehicle having a serial-parallel hybrid powertrain is thus adaptable to a driving experience in a conventional motor vehicle, so that customer acceptance for a motor vehicle having a serial-parallel hybrid powertrain may be significantly improved.

The reduction in the rotational speed preferably takes place abruptly. Within the scope of the invention, an abrupt reduction in the rotational speed is understood to mean that the reduction in the rotational speed occurs within a very short time interval, for example within one second. The abrupt reduction in the rotational speed preferably corresponds, at least essentially, to an abrupt rotational speed reduction in a conventional motor vehicle having an internal combustion engine and a shiftable multispeed transmission when upshifting during an acceleration operation. An abrupt reduction in the rotational speed conveys to the occupants of the motor vehicle a sudden gear change, and thus a sporty shifting operation. Customer acceptance for a motor vehicle having a serial-parallel hybrid powertrain may be significantly improved in this way.

Moreover, it is preferred according to the invention that the first rotational speed and the second rotational speed are selected in such a way that the second rotational speed is at least 130% of the first rotational speed. The second rotational speed is preferably at least 150%, in particular at least 200%, of the first rotational speed. A preferably large interval between the first rotational speed and the second rotational speed allows simulation of a particularly pronounced upshifting of a virtual gear, since a relatively large rotational speed spectrum is passed through. Sporty driving dynamics are thus simulated for the occupants, as the result of which customer acceptance for a motor vehicle having a serial-parallel hybrid powertrain may be significantly improved.

Likewise, the first rotational speed is selected in such a way that it is at least 130%, in particular at least 200%, of an idle speed of the internal combustion engine. This essentially corresponds to the behavior in a conventional passenger vehicle during an acceleration operation, and thus to the acoustics of the powertrain expected by the customers. Customer acceptance for a motor vehicle having a serial-parallel hybrid powertrain may be significantly improved in this way.

According to a second aspect of the invention, the object is achieved by a motor vehicle having a serial-parallel hybrid powertrain. The powertrain has an internal combustion engine, a first electric machine that is mechanically coupleable to the internal combustion engine, and a second electric machine that is mechanically coupleable to at least one wheel of the motor vehicle. According to the invention, the motor vehicle is designed for carrying out a method according to the invention.

The motor vehicle has a serial-parallel hybrid powertrain. In the serial-parallel hybrid powertrain, the internal combustion engine is mechanically coupleable to the first electric machine, so that the speed of the internal combustion engine in the coupled state is in a predefined ratio with respect to the speed of the first electric machine. The mechanical coupling is implemented by a single-speed non-shiftable transmission, for example, so that the speed of the internal combustion engine is proportional to the speed of the first electric machine. Alternatively, the mechanical coupling may also be designed as a shiftable single-speed or multispeed transmission, for example, as the result of which the drag losses of the first electric machine in parallel mode with an internal combustion engine coupled to the wheel may be reduced or avoided. The first electric machine is drivable by means of the internal combustion engine, so that the former is usable as a generator for generating electrical current. The motor vehicle according to the invention preferably has a memory unit for storing the method steps of the method according to the invention, and an engine control device for controlling the powertrain and for reading out the memory unit.

All advantages that have been described above for a method for operating a serial-parallel hybrid powertrain of a motor vehicle according to the first aspect of the invention are also obtained with the described motor vehicle. Accordingly, the motor vehicle according to the invention has the advantage over conventional motor vehicles that a relationship between the decoupled internal combustion engine and an acceleration may be established in a cost-effective manner, using simple means. The motor vehicle is operable in such a way that vibrations and noise of the internal combustion engine, which are a function of the rotational speed, do not give occupants of the motor vehicle the impression of a direct relationship between the rotational speed of the internal combustion engine and the acceleration. Customer acceptance for a motor vehicle having a serial-parallel hybrid powertrain may thus be significantly increased compared to known motor vehicles having a serial-parallel hybrid powertrain.

The internal combustion engine is preferably designed to provide constant internal combustion engine power in the rotational speed range between the first rotational speed and the second rotational speed. The internal combustion engine power in the rotational speed range between the first rotational speed and the second rotational speed is more preferably at least 75%, in particular at least 95%, of the maximum power of the internal combustion engine. The internal combustion engine power in the rotational speed range between the first rotational speed and the second rotational speed particularly preferably corresponds to the maximum power of the internal combustion engine. Such an internal combustion engine may, for example, be designed as a turbocharged internal combustion engine or as an internal combustion engine having a fairly large displacement and limitation of the maximum internal combustion engine power, in particular by an appropriate design of an engine control device of the internal combustion engine. This has the advantage that the first electric machine for generating electrical current is drivable with particularly high power. The second electric machine may thus be provided for driving the motor vehicle [with] the entire, or at least the majority, of the current that is necessary for this purpose. In this way, withdrawal of current from the battery is avoidable or at least reducible to a necessary minimum, even at high acceleration rates of the motor vehicle. This spares the battery and improves the overall efficiency of the motor vehicle.

BRIEF DESCRIPTION OF THE DRAWINGS

A method according to the invention and a motor vehicle according to the invention are explained in greater detail below with reference to the drawings, which schematically show the following.

Elements having identical functions and operating principles are provided with the same reference numerals in each of FIGS. 1 through 6.

DETAILED DESCRIPTION OF THE INVENTION

Figure 1:
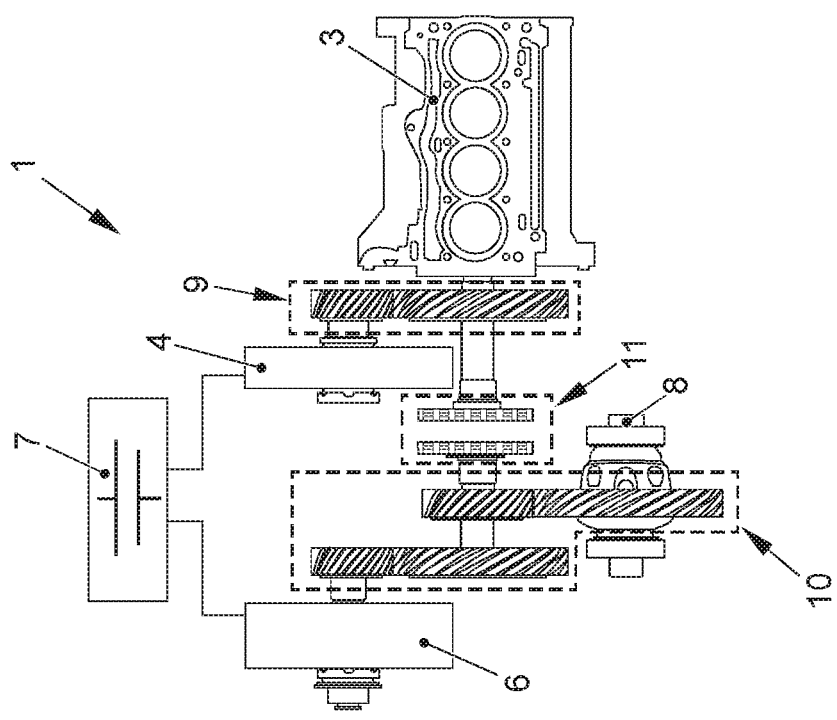
FIG. 1 shows a top view of one preferred embodiment of a serial-parallel hybrid powertrain according to the prior art.

FIG. 1 schematically shows one preferred embodiment of a serial-parallel hybrid powertrain 1 according to the prior art, in a top view. The powertrain has an internal combustion engine 3 that is mechanically coupled to a first electric machine 4 via a single-speed nonshiftable first transmission 9. The first electric machine 4 is preferably controllable via a power electronics system (not illustrated) of the serial-parallel hybrid powertrain 1. In addition, the powertrain 1 has a second electric machine 6 that is mechanically coupled to a drive axle 8 of the powertrain 1 via a single-speed nonshiftable second transmission 10. The second electric machine 6 is preferably controllable via a power electronics system (not illustrated) of the serial-parallel hybrid powertrain 1. The internal combustion engine 1 is mechanically coupleable or decoupleable to/from an intermediate stage of the second transmission 10 via a separating clutch 11. In addition, the powertrain 1 has a battery 7 that is electrically coupled to the first electric machine 4 and the second electric machine 6. Electrical current that is generated by the first electric machine 4 and/or the second electric machine 6 is thus storable in the battery 7, and electrical current is providable by the battery 7 for operating the first electric machine 4 and/or the second electric machine 6.

Figure 2:
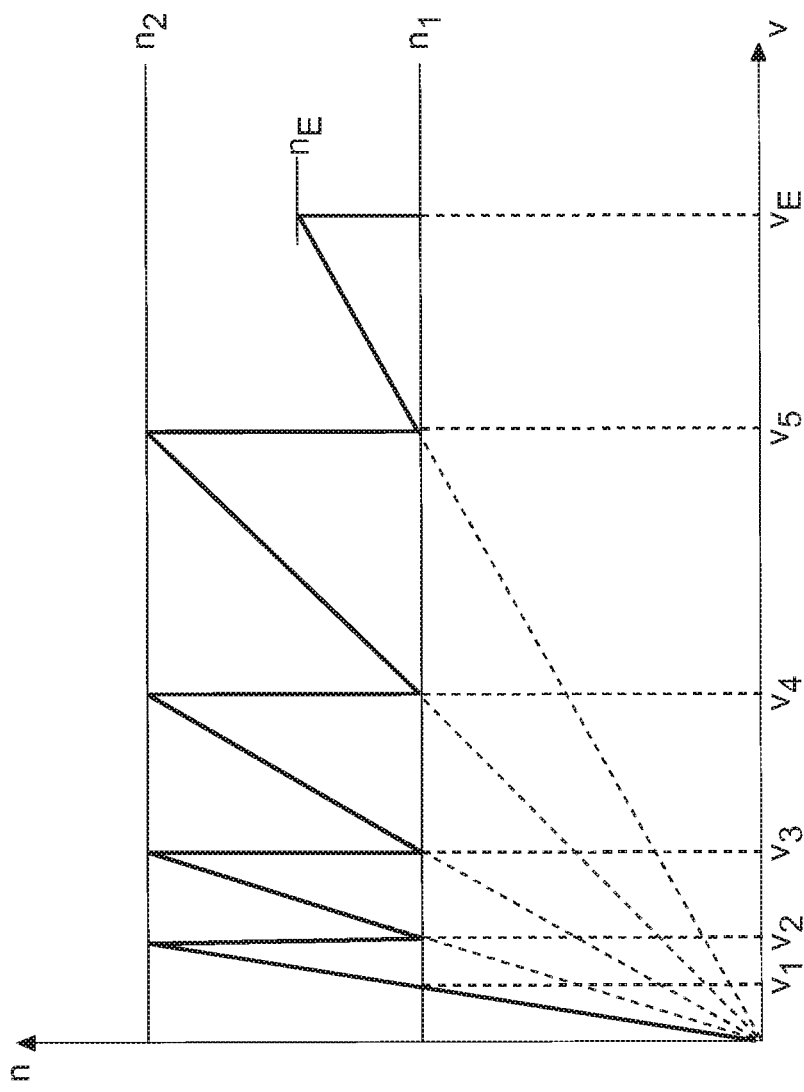
FIG. 2 shows a speed-rotational speed diagram of one preferred sequence of the method according to the invention.

FIG. 2 schematically shows one preferred sequence of the method according to the invention in a speed-rotational speed diagram. The diagram illustrates carrying out the method during an acceleration operation of a motor vehicle 2 (see FIG. 6) from a first speed $v_1$ to an end speed $v_E$. In this exemplary embodiment, the internal combustion engine 3 is mechanically decoupled from the second transmission 10, and thus from the drive axle 8, by means of the separating clutch 11. At the first speed $v_1$ the internal combustion engine 3 has a first rotational speed $n_1$. Upon acceleration of the motor vehicle 2, a rotational speed n of the internal combustion engine 3 is increased in proportion to the speed v of the motor vehicle 2, so that at a second speed $v_2$ the internal combustion engine 3 has a second rotational speed $n_2$, the second rotational speed $n_2$ being greater than the first speed $n_1$. Upon reaching the second speed $v_2$, the rotational speed n is abruptly reduced to the first rotational speed $n_1$, and upon further acceleration to a third speed $v_3$ is again increased in proportion to the speed v, so that at the third speed $v_3$ the internal combustion engine once again has the second rotational speed $n_2$. This operation is repeated until the end speed $v_E$ is reached. It may be optionally provided that the rotational speed n is reduced to an end rotational speed $n_E$ upon reaching the end speed $v_E$. By varying the rotational speed n of the internal combustion engine, the operation of a conventional powertrain having a multispeed transmission, in the present case a five-speed transmission, is simulated. Occupants of the motor vehicle 2 thus experience a familiar driving experience, so that acceptance by the occupants for the serial-parallel hybrid powertrain 1 is improved.

Figure 3:
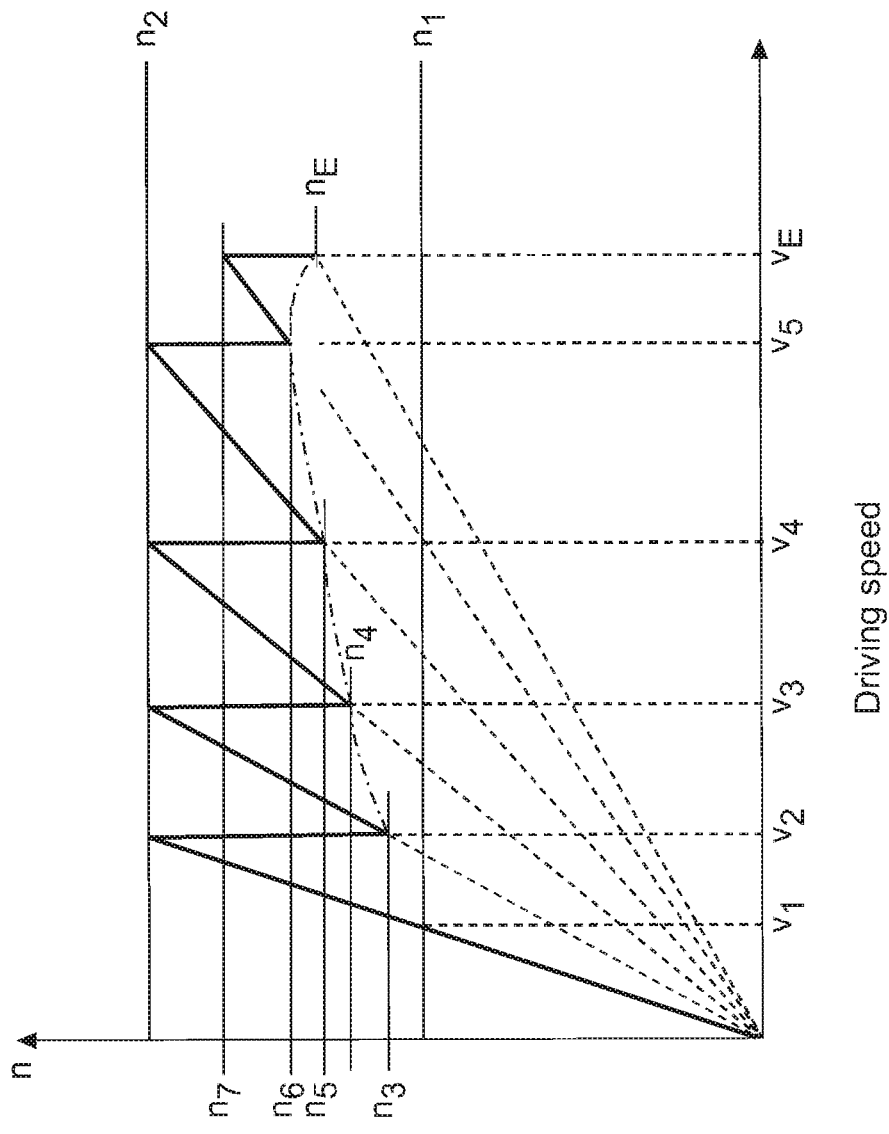
FIG. 3 shows a speed-rotational speed diagram of an alternative, preferred sequence of the method according to the invention.

FIG. 3 schematically shows another, alternative preferred sequence of the method according to the invention in a speed-rotational speed diagram. The diagram illustrates carrying out the method during an acceleration operation of a motor vehicle 2 (see FIG. 6) from a first speed $v_1$ to an end speed $v_E$. In this exemplary embodiment, the internal combustion engine 3 is mechanically decoupled from the second transmission 10, and thus from the drive axle 8, by means of the separating clutch 11. At the first speed $v_1$ the internal combustion engine 3 has a first rotational speed $n_1$. Upon acceleration of the motor vehicle 2, a rotational speed n of the internal combustion engine 3 is increased in proportion to the speed v of the motor vehicle 2, so that at a second speed $v_2$ the internal combustion engine 3 has a second rotational speed $n_2$, the second rotational speed $n_2$ being greater than the first rotational speed $n_1$. Upon reaching the second speed $v_2$, the rotational speed n is abruptly reduced to a third rotational speed $n_3$, the third rotational speed $n_3$ being greater than the first rotational speed $n_1$. Upon further acceleration to a third speed $v_3$, the rotational speed n is once again increased in proportion to the speed v, so that at the third speed $v_3$ the internal combustion engine again has the second rotational speed $n_2$. Upon reaching the third speed $v_3$, the rotational speed n is abruptly reduced to a fourth rotational speed $n_4$, the fourth rotational speed $n_4$ being greater than the third rotational speed $n_3$. Upon further acceleration to a fourth speed $v_4$, the rotational speed n is once again increased in proportion to the speed v, so that at the fourth speed $v_4$ the internal combustion engine again has the second rotational speed $n_2$. Upon reaching the fourth speed $v_4$, the rotational speed n is abruptly reduced to a fifth rotational speed $n_5$, the fifth rotational speed $n_5$ being greater than the fourth rotational speed $n_4$. Upon further acceleration to a fifth speed $v_5$, the rotational speed n is once again increased in proportion to the speed v, so that at the fifth speed $v_5$ the internal combustion engine again has the second rotational speed $n_2$. Upon reaching the fifth speed $v_5$, the rotational speed n is abruptly reduced to a sixth rotational speed $n_6$, the sixth rotational speed $n_6$ being greater than the fifth rotational speed $n_5$. Upon further acceleration to an end speed $v_E$, the rotational speed n is once again increased in proportion to the speed v, so that at the end speed $v_E$ the internal combustion engine has a seventh rotational speed $n_7$, which in the present example is greater than the second rotational speed $n_2$ and less than the sixth rotational speed $n_6$. It may optionally be provided that the rotational speed n is reduced to an end rotational speed $n_E$ upon reaching the end speed $v_E$. The end rotational speed $n_E$ may, for example, be greater than the fifth rotational speed $n_5$. The operation of a conventional powertrain having a multispeed transmission, in the present case a five-speed transmission, is simulated by varying the rotational speed n of the internal combustion engine in this way. Occupants of the motor vehicle 2 thus experience a familiar driving experience, so that acceptance by the occupants for the serial-parallel hybrid powertrain 1 is improved.

Figure 4:
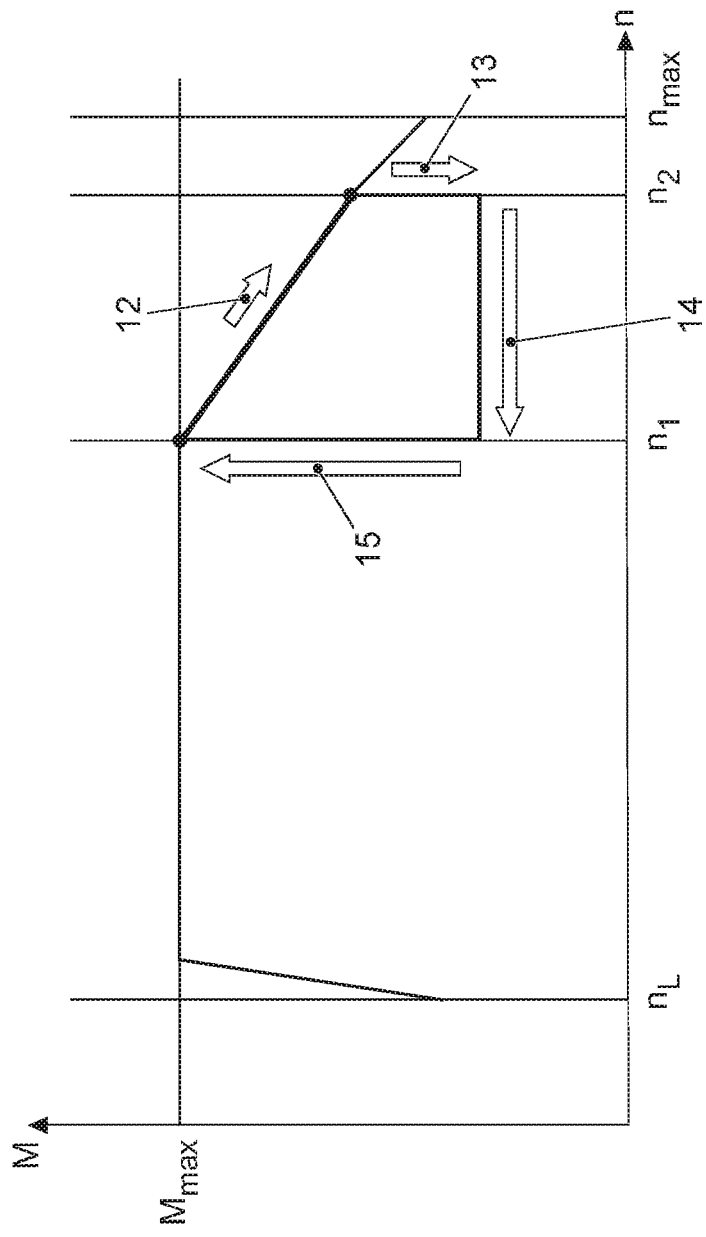
FIG. 4 shows a rotational speed-torque diagram of a preferred first process control of the method according to the invention.

FIG. 4 schematically shows a preferred first process control of the method according to the invention over multiple phases in a rotational speed-torque diagram. The internal combustion engine 3 drives the first electric machine 4 as a generator. Starting from a first rotational speed $n_1$ and a maximum torque $M_{max}$, in a first phase 12 the rotational speed n of the internal combustion engine 3 is increased to the second rotational speed $n_2$. The torque M is hereby reduced at constant or essentially constant internal combustion engine power. Upon reaching the second rotational speed $n_2$, in a second phase 13 the torque is abruptly reduced by reducing the load on the internal combustion engine 3. The first electric machine 4 continues to operate under full load upon reaching the second rotational speed $n_2$. In a third phase 14, the rotational speed n of the internal combustion engine 3 decreases to the first rotational speed $n_1$ due to the power deficit. The power of the first electric machine 4 is now provided by the inertia of the internal combustion engine 3. After reaching the first rotational speed $n_1$, in a fourth phase 15 the internal combustion engine 3 is once again operated under full load, so that the starting point at the maximum torque $M_{max}$ and the first rotational speed $n_1$ is again reached. Upshifting of a virtual gear and subsequent upshifting to a virtual higher gear are simulated in this way.

Figure 5:
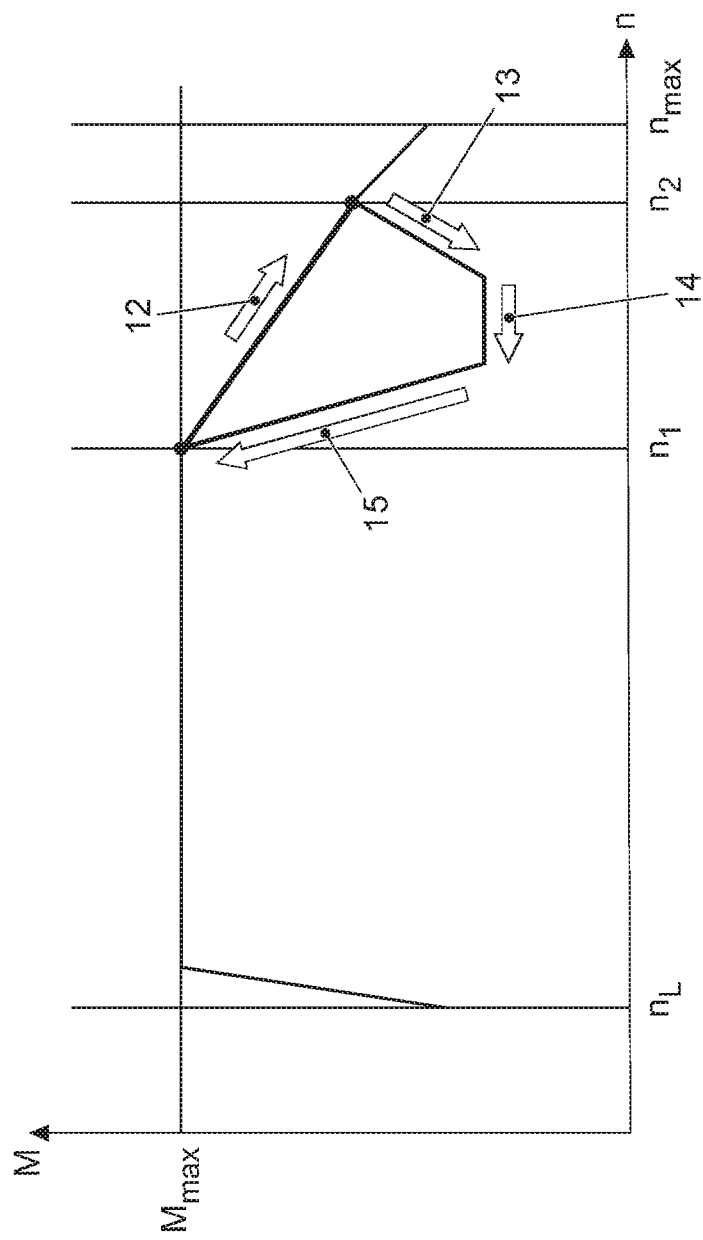
FIG. 5 shows a rotational speed-torque diagram of a preferred second process control of the method according to the invention.

FIG. 5 schematically shows a preferred second process control of the method according to the invention over multiple phases in a rotational speed-torque diagram. The second process control differs from the first process control in that in the second phase 13, the load variation of the internal combustion engine 3 no longer takes place abruptly, but instead occurs continuously according to so-called "down-ramping." Likewise, in the fourth phase 15 the load increase on the internal combustion engine 3 no longer takes place abruptly, but instead occurs continuously according to so-called "up-ramping." Knocks in the powertrain 1 may thus be avoided, and the robustness of the method may be increased. During the second process control, the third phase 14 is therefore shorter than during the first process control.

Figure 6:
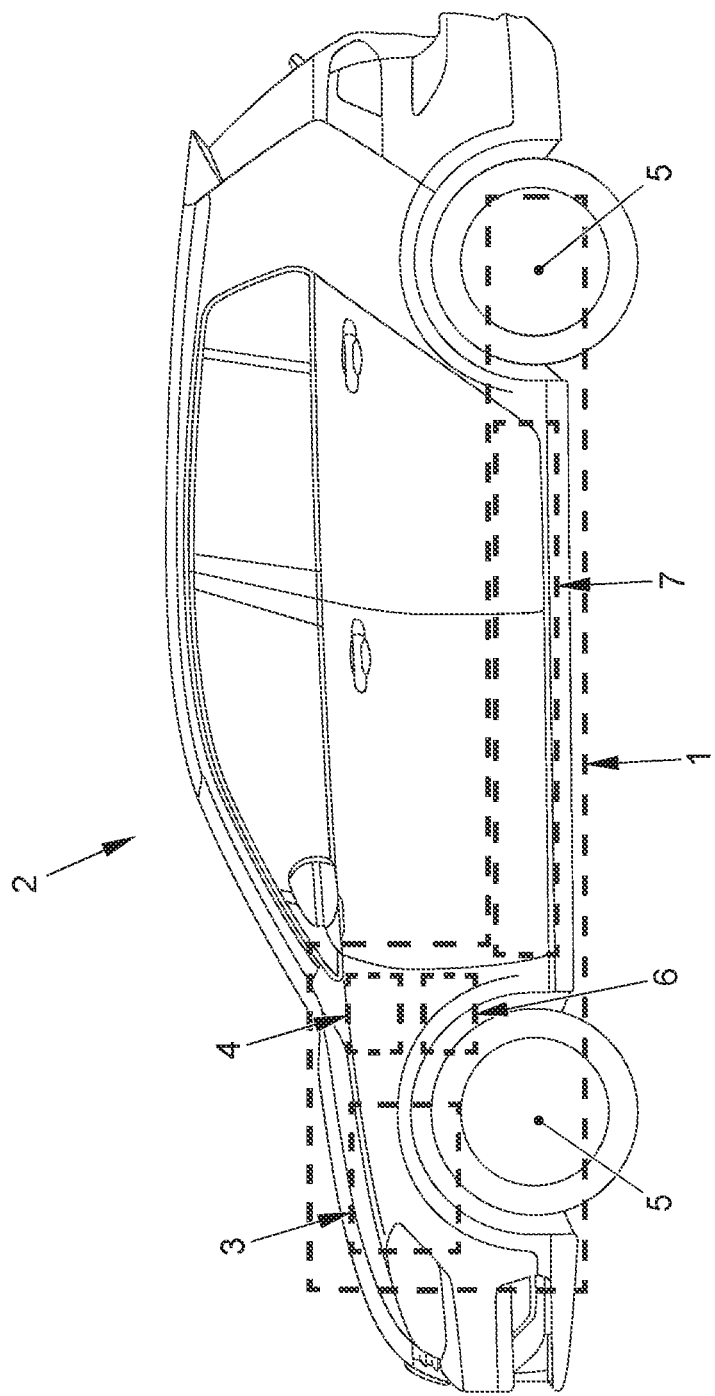
FIG. 6 shows a side view of one preferred embodiment of a motor vehicle according to the invention having a serial-parallel hybrid powertrain.

FIG. 6 schematically shows one preferred embodiment of a motor vehicle 2 according to the invention having a serial-parallel hybrid powertrain 1 and wheels 5, in a side view. The powertrain 1 has an internal combustion engine 3, a first electric machine 4, a second electric machine 6, and a battery 7. The powertrain 1 is preferably designed according to a known powertrain 1 from FIG. 1, the motor vehicle 2 according to the invention being designed and configured for carrying out the method according to the invention. For this purpose, for example the method steps may be stored in a memory unit (not illustrated) of an engine control device (not illustrated). The engine control device is designed for controlling the powertrain 1 and for reading out the memory unit.

LIST OF REFERENCE NUMERALS 1 powertrain
2 motor vehicle
3 internal combustion engine
4 first electric machine
5 wheel
6 second electric machine
7 battery
8 drive axle
9 first transmission
10 second transmission
11 separating clutch
12 first phase
13 second phase
14 third phase
15 fourth phase
M torque
$M_{max}$ maximum torque
$n_1$ first rotational speed
$n_2$ second rotational speed
$n_3$ third rotational speed
$n_4$ fourth rotational speed
$n_5$ fifth rotational speed
$n_6$ sixth rotational speed
$n_7$ seventh rotational speed
$n_E$ end rotational speed
$n_L$ idle speed
$n_{max}$ maximum rotational speed
v speed
$v_1$ first speed
$v_2$ second speed
$v_3$ third speed
$v_4$ fourth speed
$v_5$ fifth speed
$v_E$ end speed

The invention claimed is:

1. A method for operating a serial-parallel hybrid powertrain of a motor vehicle, the powertrain having an internal combustion engine, a first electric machine that is mechanically coupleable to the internal combustion engine, and a second electric machine that is mechanically coupleable to at least one wheel of the motor vehicle, the method having the following steps:
mechanically decoupling the internal combustion engine from the wheels of the motor vehicle,
accelerating the motor vehicle from a first speed to a second speed by means of the second electric machine,
increasing a rotational speed of the internal combustion engine from a first rotational speed to a second rotational speed, as a function of the increase in the speed v of the motor vehicle from the first speed to the second speed; and
accelerating the motor vehicle is from the second speed to a third speed, wherein the rotational speed of the internal combustion engine at the second speed is initially reduced and then subsequently increased once again, such that the reduction in the rotational speed takes place more rapidly than the increase in the rotational speed.

2. The method according to claim 1, wherein the increase in the rotational speed takes place in proportion to the increase in the speed.

3. The method according to claim 1, wherein, in the reduction of the rotational speed, the speed of the internal combustion engine is reduced from the second rotational speed to the first rotational speed or a higher rotational speed n than the first rotational speed.

4. The method according to claim 1, wherein the subsequent increase in the speed of the internal combustion engine takes place in such a way that, at the third speed, the internal combustion engine has the second rotational speed.

5. The method according to claim 1, wherein the reduction in the rotational speed n takes place abruptly.

6. The method according to claim 1, wherein the first rotational speed and the second rotational speed are selected in such a way that the second rotational speed is at least 130% of the first rotational speed.

7. The method according to claim 1, wherein the first rotational speed is selected in such a way that it is at least 200% of an idle speed of the internal combustion engine.

8. A motor vehicle having a serial-parallel hybrid powertrain, the hybrid powertrain having an internal combustion engine, a first electric machine that is mechanically coupleable to the internal combustion engine, and a second electric machine that is mechanically coupleable to at least one wheel of the motor vehicle, wherein the motor vehicle is designed for carrying out a method according to claim 1.

9. The motor vehicle according to claim 8, wherein the internal combustion engine is designed to provide constant internal combustion engine power in the rotational speed range between the first rotational speed and the second rotational speed.

* * * * *